United States Patent [19]

Swenson

[11] Patent Number: 5,612,066
[45] Date of Patent: Mar. 18, 1997

[54] IMPROVED HEAT INSULATING MOLD PANEL FOR A MOLD TOOL

[75] Inventor: Harold W. Swenson, Dover, N.H.

[73] Assignee: Davidson Textron, Inc., Dover, N.H.

[21] Appl. No.: 419,905

[22] Filed: Apr. 11, 1995

[51] Int. Cl.⁶ .......................... B29C 41/18; B29C 41/38
[52] U.S. Cl. .................. 425/425; 249/114.1; 425/435; 425/DIG. 30
[58] Field of Search .................. 425/425, 435, 425/DIG. 30; 428/68, 71, 313.9, 319.3; 249/114.1, 115

[56] References Cited

U.S. PATENT DOCUMENTS

| | | | |
|---|---|---|---|
| 2,806,509 | 9/1957 | Bozzacco et al. | 428/313.9 |
| 3,314,639 | 4/1967 | Barnett | 425/425 |
| 3,761,047 | 9/1973 | Mao | 249/115 |
| 4,463,043 | 7/1984 | Reeves et al. | 428/313.9 |
| 4,683,098 | 7/1987 | Belleville et al. | 425/435 |
| 4,716,003 | 12/1987 | Gaudreau | 425/435 |
| 4,790,510 | 12/1988 | Takamatsu et al. | 425/435 |
| 5,074,773 | 12/1991 | Tischler | 425/435 |
| 5,221,539 | 6/1993 | Pallerberg et al. | 425/435 |
| 5,225,214 | 7/1993 | Filion | 264/310 |
| 5,234,639 | 8/1993 | Smith | 264/46.5 |
| 5,290,499 | 3/1994 | Tischler | 425/435 |
| 5,318,822 | 6/1994 | Rhodes | 428/120 |
| 5,320,896 | 6/1994 | Smith | 428/192 |
| 5,468,141 | 11/1995 | Iwami et al. | 249/114.1 |

FOREIGN PATENT DOCUMENTS 4-235008  8/1992  Japan.
6-143309  5/1994  Japan.

*Primary Examiner*—Robert Davis
*Attorney, Agent, or Firm*—Reising, Ethington, Barnard & Perry

[57] ABSTRACT

A heat insulating panel (20) for a mold tool (14) includes a surface for being mounted onto a section of the mold tool. The panel has an exposed upper surface (29) and a thickness great enough to provide heat insulation sufficient to maintain the temperature at its exposed upper surface lower than the melting temperature of a powder plastic resin (13) that is melted and cured onto the mold tool. Any powder plastic resin on the upper surface remains in powder form during molding such that the powder may be returned to a powder box (12) and be reused. The heat insulating panel (20) has a periphery (21) that covers the entire periphery of the mold tool.

5 Claims, 2 Drawing Sheets

IMPROVED HEAT INSULATING MOLD PANEL FOR A MOLD TOOL

TECHNICAL FIELD

The field of this invention relates to heat insulating panels for mold tools and powder molding methods.

BACKGROUND OF THE DISCLOSURE

Several molding methods have been developed to make shaped thin plastic shells especially suitable for use in automobile trim components. One such method includes a shell made from dried thermoplastic powder material that is deposited on a heated mold tool. The plastic melts to form a skin contoured with the tool surface. The melted skin is then cured and removed from the tool surface as a finished or nearly finished part.

The molding process is accomplished with a powder box and mold box being sealed at their interface. Much attention has been directed to reducing the waste and subsequent trimming steps associated with this molding process. Waste is formed when the powder resin contacts parts of the mold where such contact is not desired. This waste then must be trimmed in a subsequent step resulting in wasted powder and extra labor steps.

Some efforts to reduce this waste material and the accompanying labor have been attempted. A powder box has been known that includes a skirt portion connected thereto having a lowered edge which contacts the shaped periphery of the mold. The problem with this system is that the skirt must be uniquely adapted to each unique mold shaped periphery. Furthermore, the skirt causes the clearance stroke of the powder box to be significantly lengthened in order to clear the mold thereby increasing cycle time. Furthermore, because the powder box needs to lowered below the mold, deep pits must be dug out under the molding tools to accommodate the lowering of the powder box.

Heat insulators have also been attached to powder boxes in an attempt to cool the neck portion of the powder box where the powder box is connected to the heated mold thereby preventing melting of the powder on the powder box neck. This heat insulator reduces waste build up in the neck area.

What is needed is a heat insulator that can be mounted to the mold and prevent the powder plastic resin from gelling or melting thereon to reduce waste and subsequent trimming and furthermore increases the life of the sealing gasket between the mold tool and powder box.

SUMMARY OF THE DISCLOSURE

In accordance with one aspect of the invention, a method of molding a shaped article includes the steps of applying a heat insulating panel on a section of a mold surface of a molding tool and leaving an exposed section of the molding surface, preheating the exposed section of the mold surface, applying a gelling powder resin on the exposed mold surface and the heat insulating panel such that the powder resin on the exposed mold surface melts and the powder deposited on the panel remains in powder form. The powder on the heat insulating panel is then returned to the powder box to be reused. The melted plastic on the tool is then cured and removed from the mold tool as a formed molded shell.

The method includes the step of closing a powder box onto the heat insulating panel before the plastic powder resin is applied, opening the powder box from the mold tool and heat insulating panel after the powder resin is applied onto the mold tool, and retaining the heat insulating panel on the mold tool throughout the closing and opening of the powder box on and off the mold tooling.

In accordance with another aspect of the invention, the heat insulating panel for a mold tool includes a lower surface for being mounted onto a section of the mold tool. The panel has an exposed upper facing surface and a thickness great enough to provide heat insulation sufficient to maintain the temperature at its upper surface lower than the melting temperature of a utilized powder plastic resin. Plastic powder deposited on the exposed upper surface remains in powder form during the molding process.

Preferably, the heat insulating panel has lower, side, and upper facing walls made from laminated layers of fiberglass and silicone rubber. The inner core is filled with silicone rubber and contains a plurality of hollow glass beads. In one embodiment, the lower, side, and upper facing walls are made from a male and female member mated together to form the inner core therein. The upper and lower walls are spaced to form a panel having a thickness between approximately 0.5" and 0.75".

Preferably, the heat insulating panel has a periphery that covers the entire periphery of the mold tool. One or more island panels may be incorporated within the mold tool to form an interior opening in the molded article.

BRIEF DESCRIPTION OF THE DRAWINGS

Reference now is made to the accompanying drawings in which.

DETAILED DESCRIPTION OF THE PREFERRED EMBODIMENT

Figure 1:
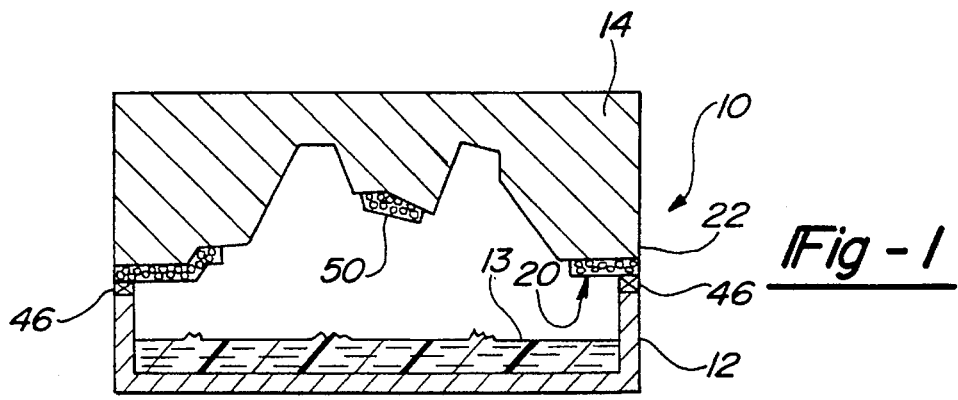
FIG. 1 is a schematic elevational view of a mold assembly illustrating one embodiment of the invention.

Referring now to FIG. 1, a mold assembly 10 includes a housing for rotatably supporting a powder box 12 and mold tool 14. The powder box 12 can be opened and closed with respect to the mold tool 14 and the entire assembly is pivoted between a right side up and upside down position for supplying a gelling plastic powder material such as drysol to the mold tool 14 or for emptying the mold tool 14 of the plastic powder. The mold tool 14 is preheated by suitable means for example heated air flow, hot oil piping or electric coils such that the plastic powder deposited thereon will melt.

Figure 2:
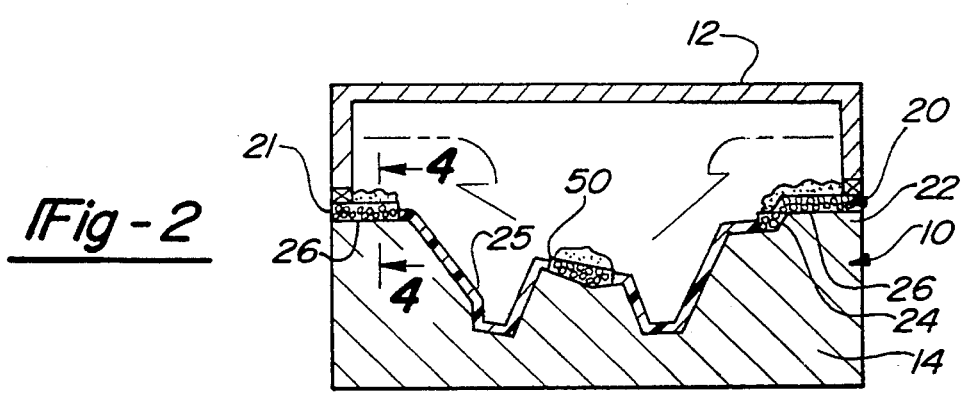
FIG. 2 is an schematic elevational and segmented view of the mold assembly in the closed and rotated position for molding the plastic article.
Figure 3:
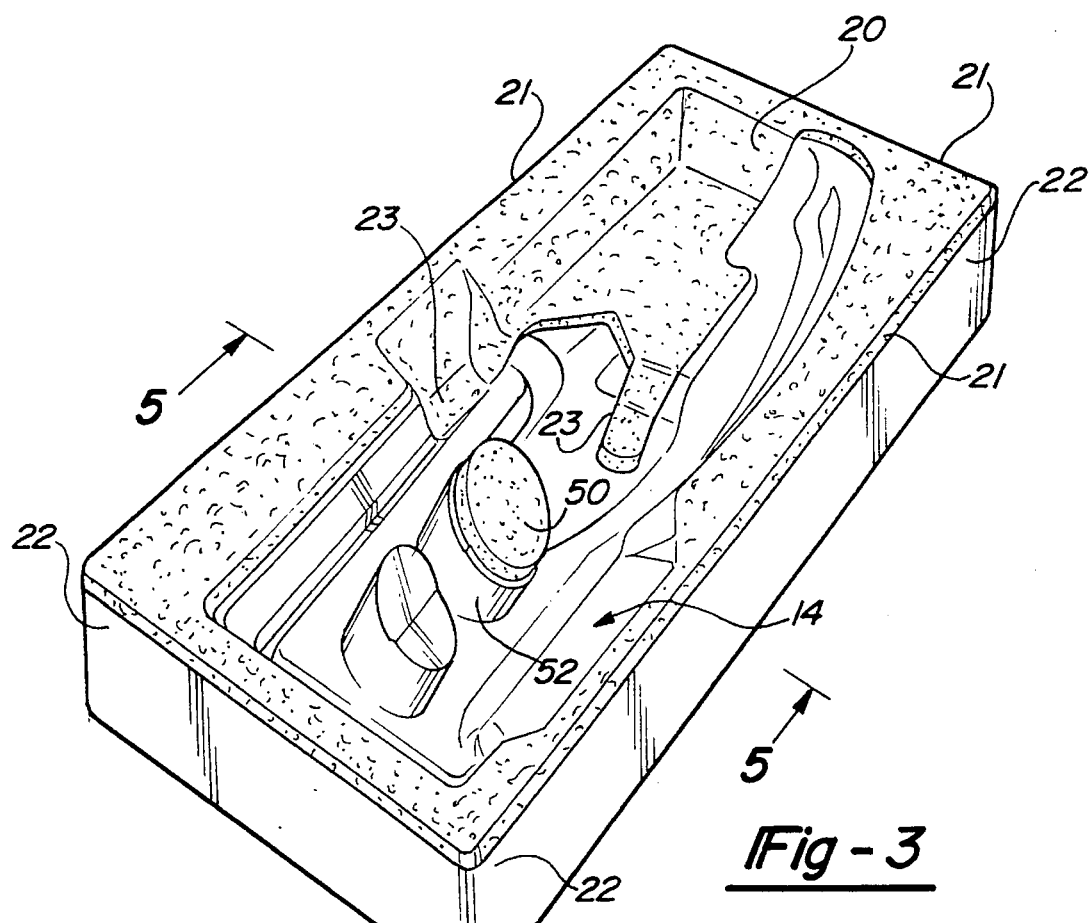
FIG. 3 is top perspective view of the mold tool shown in FIG. 2 with the powder box removed for clarity.
Figure 6:
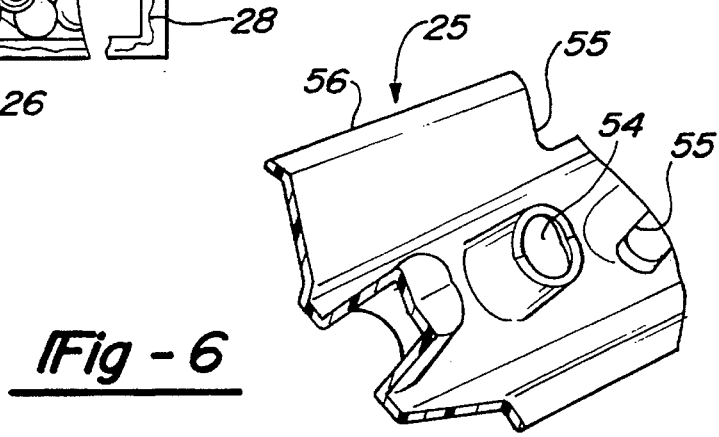
FIG. 6 is a perspective view of a finished article made in the mold tool shown in FIG. 1.

As shown clearly in FIGS. 2 and 3, a heat insulating panel 20 is secured onto the mold tool 14. The heat insulating panel 20 has a periphery 21 that aligns with the entire periphery 22 of the mold tool. At places where it is desired that the plastic does not gel to the mold tool and does not form part of the finished molded article 25, the panel 20 has an extension 23 that extends inwardly toward the center of the mold tool 14 and follows the contoured surface 24 of the mold tool. These contoured extensions 23 form ducts and notches 55 in the finished molded shell as shown in FIG. 6. An adhesive may secure the bottom wall 26 of the panel to the mold tool 14.

Figure 4:
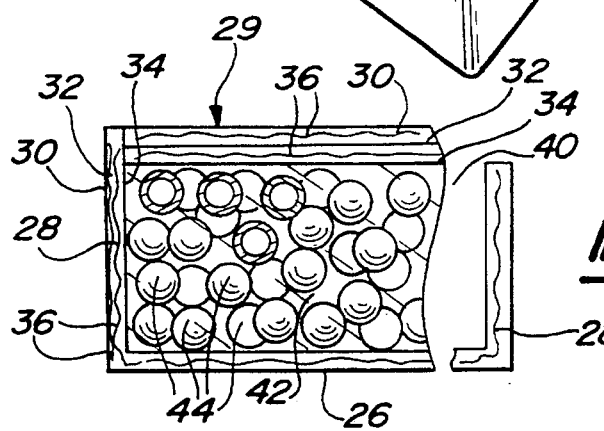
FIG. 4 is an enlarged cross-sectional view of the heat insulating panel taken along lines 4—4 shown in FIG. 2.

As shown in FIG. 4, the panel 20 has its lower wall 26 and side walls 28 form a female mold member made from a lamination of outer, middle and inner layers 30, 32, and 34 of silicone rubber such as V-270 with two layers of fiber glass mat 36 laminated therebetween. The upper facing wall 29 forms a male mold member made similarly from the above mentioned laminations of silicone rubber and fiberglass mat. The female and male mold members are joined to form a hollow inner core 40 that is then filled with a mix of silicone rubber 42 such as U-220 and hollow glass spheres 44. The glass spheres are approximately 3/16" diameter. The total thickness of the heat insulating panel should be at least 0.5" and maybe as thick as 0.75" for certain applications in order to sufficiently insulate heat transfer from the mold tool therethrough during the molding process. It should be understood that the reference to the lower wall and upper facing walls 26 and 29 are with reference to FIG. 2 and 3 where the mold is open facing upwardly and is reversed in spatial relationship in FIGS. 1 and 5 where the mold is open facing downwardly.

Other types of panel construction are possible that provide the sufficient degree of heat insulation. Molded porous ceramic is also seen to be a viable alternative construction.

The powder box 12 has a sealing gasket 46 at its open periphery 48 that can seal against the periphery 21 of the panel 20 when in the closed position as shown in FIGS. 1 and 2. Because the gasket 46 does not directly contact the heated mold tool 14, its durability is greatly enhanced.

An island heat insulating panel 50 may be adhered to an interior section 52 of the mold tool 14 to form an interior opening 54 in the finished article. The construction of the island heat insulating panel 50 is substantially identical to panel 20.

In operation, the mold tool assembly 10 is operated by having it closed with the appropriate mold 14 and fitted panels 20 and 50. The powder box 14 has the appropriate charge of plastic powder 13 therein. The mold tool is heated to its appropriate temperature and the mold assembly 10 is pivoted from the position shown in FIG. 1 to the position shown in FIG. 2 where the powder falls onto the mold tool 14 and the panels 20 and 50. The powder on the mold tool 14 melts while the powder on the heat insulating panel 14 remains in powder form. The mold is pivoted again and opened as shown in FIG. 5 where the remaining powder falls back into the powder box 12 to be reused.

The mold tool 14 can then be laterally moved from directly over the powder box 12. The mold tool 14 can then be further pivoted, heated, and cooled to cure the finished plastic article 25. The finished article 25 can then be removed from the mold tool 14 as shown in FIG. 6.

Figure 5:
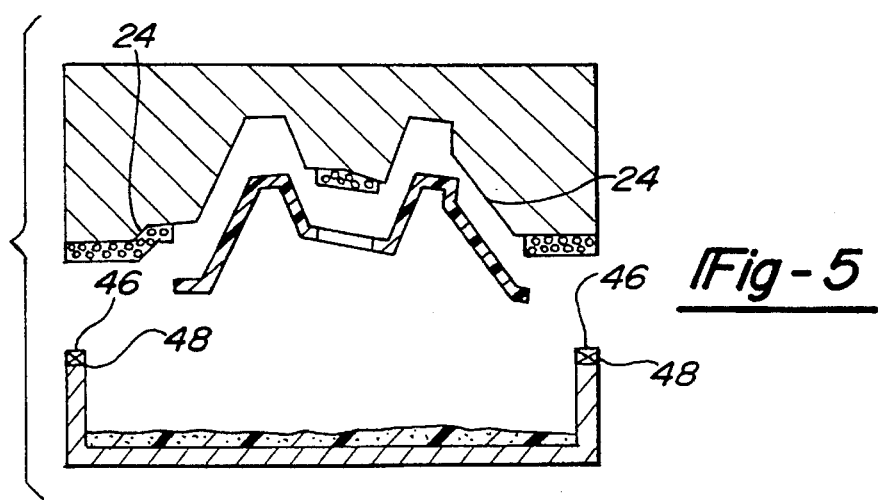
FIG. 5 is a schematic elevational view similar to FIG. 1 showing the mold and powder box in the open position with the article separated therebetween.

For opening the mold assembly 10, the powder box 12 is merely dropped from the mold tool 14 as shown in FIG. 5. There is no extra depth required due to any draw clearances of any side walls or extension panels mounted on the powder box. The panels 20 and 50 remain secured on the mold tool 14.

Once the article 25 is removed from the mold tool, the mold tool 14 needs very little if any cleaning to be ready for another cycle. There is no unwanted melted powder stuck on undesirable parts of the mold tool. The dry powder that is on the heat insulating panels 20 and 50 is recycled before it is undesirably melted. Furthermore, the article 25 needs little if any trimming along its periphery 56, notches 55, or interior aperture 54.

Variations and modifications are possible without departing from the scope and spirit of the present invention as defined by the appended claims.

The embodiments in which an exclusive property or privilege is claimed are defined as follows:

1. A heat insulating mold panel for a powder molding tool, said panel characterized by:

a surface for being mounted onto a section of mold tool;

said panel having an exposed upper surface and a thickness great enough to provide heat insulation sufficient to maintain its temperature lower at its exposed upper surface than the melting temperature of a powder plastic resin that is melted on said mold tool to retain any powder plastic resin on said exposed surface in powder form during molding with said mold tool;

said heat insulating panel having inner, side and outer walls made from laminated alternating layers of fiberglass and silicone rubber; and an inner core filled with silicone rubber and a plurality of hollow glass beads.

2. A heat insulating mold panel as defined in claim 1 further characterized by:

said outer side and inner walls made from a male and female member mated together to form said inner core therein.

3. A heat insulating mold panel as defined in claim 1 further characterized by:

said outer and inner walls being spaced to form an inner core having a thickness between approximately 0.5" and 0.75".

4. A heat insulating mold panel as defined in claim 1 further characterized by:

said heat insulating panel having an outer periphery that is constructed to be seatable on said mold tool and is constructed to be abuttable against a powder box and to form a seal therewith when said powder box closes onto said mold tool.

5. A heat insulating mold panel as defined in claim 4 further characterized by:

said insulating panel having an outer periphery that is constructed to be seatable on said mold tool and is constructed to completely cover an outer periphery of said mold tool, said panel also being constructed to abut said powder box and to form a seal therewith when said powder box closes onto said mold tool.

\* \* \* \* \*